W. A. BRICE.
MARINE ENGINE-GOVERNOR.
No. 191,023. Patented May 22, 1877
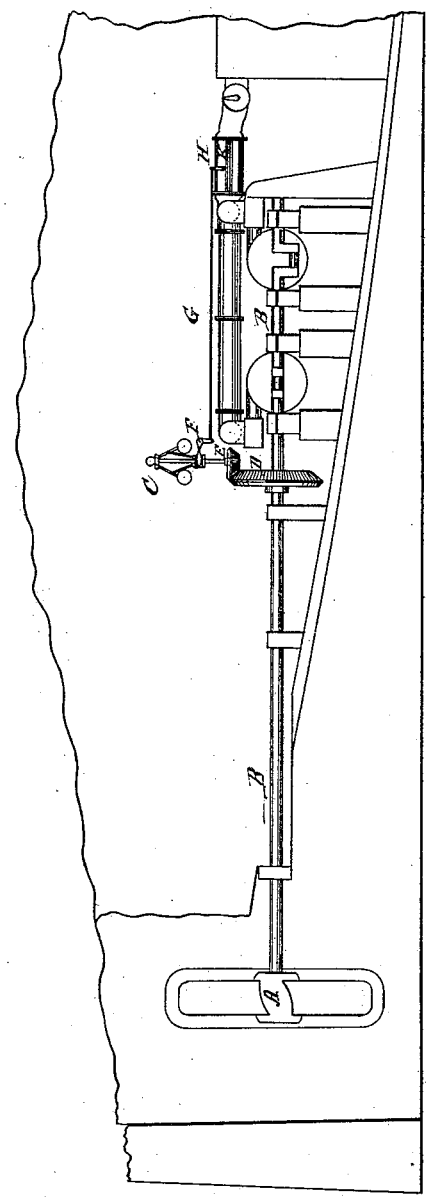

UNITED STATES PATENT OFFICE.

WILLIAM A. BRICE, OF LONDON, ENGLAND.

IMPROVEMENT IN MARINE-ENGINE GOVERNORS.

Specification forming part of Letters Patent No. 191,023, dated May 22, 1877; application filed December 12, 1876.

*To all whom it may concern:*

Be it known that I, WILLIAM A. BRICE, of Middle Temple Lane, London, England, have invented a new and Improved Means for Preventing the Racing of Marine-Engines; and I do hereby declare that the following is a full, clear, and exact description of the same.

My invention relates to improved means of governing the speed of marine engines, to prevent what is known as "racing," when the screw is momentarily raised out of the water.

The invention consists in a centrifugal governor, of any suitable construction, driven by toothed gear direct from the screw-shaft, and operating a throttle-valve of any kind in one of two steam-pipes, by which, for the purposes of my invention, steam is supplied to the engines—that is to say, where one pipe has been used before to convey steam from the boiler to the engines, I use two pipes, and in one of them I apply a valve operated by the governor, as above described, so that immediately the screw commences to turn at a higher speed the valve will be closed, and the steam cut off through that pipe.

If the sectional areas of the two pipes be equal, half the steam-supply is thus cut off, the other half through the other pipe being intended to keep the engines in motion at the same speed; but I do not limit myself to pipes of equal size, but use pipes of such relative dimensions as may enable that object to be attained.

The accompanying drawing represents one arrangement of my invention.

A is the screw, and B the screw-shaft. C is an ordinary ball or other kind of governor, driven at a considerably higher speed than that of the shaft B, by a bevel pin-wheel, D, keyed on said shaft gearing with a bevel-pinion, E, on the governor-spindle, or by any other arrangement of gearing. The sliding collar of the governor, which is acted on by the balls in the usual way, is connected through a series of levers and rods, F G, or other connections with the lever H of a throttle or other valve, in one, K, of the two pipes, which convey steam from the boiler to the engine.

By this arrangement, the governor being driven direct by the screw-shaft, and at a much higher speed than the shaft when the screw commences to turn faster than its normal speed, the speed of the governor will be almost instantaneously increased and to a much greater extent. Thus the increase of speed of the screw-shaft for even a fraction of a revolution is sufficient to make the governor-balls fly out, operate valve, and cut off the steam through the pipe K, thereby limiting the supply to what is necessary to maintain the engine at the normal speed until the screw again dips in the water, whereupon the valve is again opened to admit the full supply of steam to the engine.

Instead of two steam-pipes, I may use a single steam-pipe made two-part by a longitudinal division-plate.

When there is only one valve, and that connected with the governor, so that the latter will cut off steam gradually as the speed of the screw-shaft increases, there is danger of injury to the engine and machinery whenever the screw is suddenly thrown out of the water. The resistance of the water being entirely removed, the screw-shaft rotates with fearful velocity, and causes the governor to close the throttle-valve, thus suddenly stopping the engine, and creating a great shock. By using my second steam-supply pipe, with valve set to always supply a minimum of steam, independently of the governor, this is entirely prevented.

It will then be observed that I furnish a certain constant supply of steam that will always suffice to drive the machinery at a moderate speed, while the governor only affects the speed above that by curtailing, or, in the event of the screw being thrown out of the water, cutting off entirely the steam passing through the governor-valve pipe.

Having thus described my invention, what I claim as new is—

In a marine-engine, the combination of a two-part steam-pipe, or its equivalent, with a steam-valve, governor, and screw-shaft, with intermediate connecting and driving mechanism, substantially as described.

The above specification of my invention signed by me this 11th day of September, 1876.

WILLIAM ALEXANDER BRICE.

Witnesses:
  J. J. WILSON,
  H. BENNETT.